US011068433B2

(12) United States Patent
Maung et al.

(10) Patent No.: US 11,068,433 B2
(45) Date of Patent: Jul. 20, 2021

(54) SERIAL BUS REPEATER WITH LOW POWER STATE DETECTION

(71) Applicant: TEXAS INSTRUMENTS INCORPORATED, Dallas, TX (US)

(72) Inventors: Win Naing Maung, Plano, TX (US); Suzanne Mary Vining, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 62 days.

(21) Appl. No.: 16/433,661

(22) Filed: Jun. 6, 2019

(65) Prior Publication Data

US 2020/0125527 A1 Apr. 23, 2020

Related U.S. Application Data

(60) Provisional application No. 62/747,305, filed on Oct. 18, 2018.

(51) Int. Cl.
*G06F 13/42* (2006.01)
*G06F 1/3206* (2019.01)
*G06F 13/38* (2006.01)

(52) U.S. Cl.
CPC ........ *G06F 13/4291* (2013.01); *G06F 1/3206* (2013.01); *G06F 13/382* (2013.01); *G06F 2213/0042* (2013.01)

(58) Field of Classification Search
CPC .. G06F 13/4282; G06F 1/266; G06F 13/4068; G06F 1/3203; G06F 1/3287; G06F 1/325; G06F 1/3278; G06F 1/3296; G06F 13/4086; G06F 1/3265; G06F 2213/0042; G06F 1/3206; G06F 1/3246

USPC ....... 713/300, 320, 310, 321, 323, 324, 340; 710/106, 100
See application file for complete search history.

(56) References Cited

U.S. PATENT DOCUMENTS

| 6,034,551 | A | * | 3/2000 | Bridgewater, Jr. ...... H03K 19/018514 326/82 |
| 7,761,645 | B2 | * | 7/2010 | Monks ................. G06F 13/426 710/313 |
| 10,205,537 | B2 | | 2/2019 | Maung et al. |
| 2010/0060314 | A1 | * | 3/2010 | Boericke, II ....... G06F 13/4086 326/30 |
| 2011/0173424 | A1 | * | 7/2011 | Claudet ................... G06F 1/32 713/1 |

(Continued)

OTHER PUBLICATIONS

"USB 2.0 Link Power Management Addendum." USB Engineering Change Notice: Universal Serial Bus Specification, Revision 2.0. pp. 1-29.

*Primary Examiner* — Faisal M Zaman
(74) *Attorney, Agent, or Firm* — John R. Pessetto; Charles A. Brill; Frank D. Cimino

(57) ABSTRACT

A serial bus repeater includes a port circuit and a low power state detection circuit. The port circuit is configured to communicate via a serial bus. The low power state detection circuit includes a power state transaction identification circuit and a bus state identification circuit. The power state transaction identification circuit is configured to identify a power state transaction on the serial bus. The power state transaction is indicative of entering a reduced power state. The bus state identification circuit is configured to identify a value of termination resistance on the serial bus that is indicative of entering the reduced power state.

6 Claims, 3 Drawing Sheets

(56) References Cited

U.S. PATENT DOCUMENTS

| | | | |
|---|---|---|---|
| 2011/0316521 A1* | 12/2011 | Brooks | G06F 1/266 |
| | | | 323/364 |
| 2012/0194273 A1* | 8/2012 | Chuang | H03F 3/45183 |
| | | | 330/253 |
| 2013/0185462 A1* | 7/2013 | Manabe | G06F 13/4068 |
| | | | 710/16 |
| 2014/0189409 A1* | 7/2014 | Jeyaseelan | G06F 13/102 |
| | | | 713/324 |
| 2014/0215118 A1* | 7/2014 | Senuma | G06F 13/4086 |
| | | | 710/316 |
| 2014/0312927 A1* | 10/2014 | Lee | H04L 25/0272 |
| | | | 326/30 |
| 2017/0270067 A1* | 9/2017 | Hu | G06F 13/366 |
| 2017/0286351 A1* | 10/2017 | Williams | H04L 67/104 |
| 2018/0004685 A1* | 1/2018 | Bhatt | G06F 13/4027 |
| 2019/0068397 A1* | 2/2019 | Chen | H04L 12/40 |
| 2019/0288743 A1* | 9/2019 | Wang | H04B 3/36 |

* cited by examiner

SERIAL BUS REPEATER WITH LOW POWER STATE DETECTION

CROSS-REFERENCE TO RELATED APPLICATIONS

The present application claims priority to U.S. Provisional Patent Application No. 62/747,305, filed Oct. 18, 2018, entitled "High Speed Isolated or Non-Isolated USB 2.0 Repeater That Can Detect High Speed L1 Protocol Sequence State Without Using a CDR or PLL," which is hereby incorporated herein by reference in its entirety.

BACKGROUND

Serial buses, such as the Universal Serial Bus (USB), are widely used to connected systems of devices. The expansion of USB has resulted in a wide variety of USB device with varying power requirements. To reduce the power consumed by operation of USB devices, the devices may implement power management in accordance with the link power management specification of USB 2.0. Link power management defines a reduced power state (a sleep state) that can be quickly (e.g., tens of microseconds) negotiated between devices connected via USB.

SUMMARY

In one example, a serial bus repeater includes a port circuit and a low power state detection circuit. The port circuit is configured to communicate via a serial bus. The low power state detection circuit includes a power state transaction identification circuit and a bus state identification circuit. The power state transaction identification circuit is configured to identify a power state transaction on the serial bus. The power state transaction is indicative of entering a reduced power state. The bus state identification circuit is configured to identify a value of termination resistance on the serial bus that is indicative of entering the reduced power state.

In another example, a serial bus repeater circuit includes a differential receiver circuit, a first termination resistor, a second termination resistor, a power state transaction identification circuit, and a bus state identification circuit. The first termination resistor is coupled to the differential receiver circuit. The second termination resistor is coupled to the differential receiver circuit. The power state transaction identification circuit is coupled to an output of the differential receiver circuit. The bus state identification circuit is coupled to the first termination resistor, the second termination resistor, and the power state transaction circuit. The bus state identification circuit includes a switch, a current source, and a comparator. The switch includes a first terminal coupled to the first termination resistor and the second termination resistor, and a second terminal coupled to ground. The current source is coupled to the first terminal of the switch. The comparator includes a first input coupled to the first terminal of the switch, and a second input coupled to a threshold voltage source.

In a further example, a method for identifying a reduced power state on a serial bus includes identifying a power state transaction on the serial bus. The power state transaction is indicative of entering the reduced power state. The method also includes identifying a value of termination resistance on the serial bus responsive to identifying the power state transaction. The termination resistance is indicative of entering the reduced power state.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The universal serial bus (USB) link power management (LPM) specification defines four power management states that may be implemented by a device. The four power management states include L0 (On), L1 (Sleep), L2 (Suspend), and L3 (Off). LPM added the L1 state to the USB specification, while the conditions corresponding to the L0, L2, and L3 states antedate the LPM specification. The L1 state is entered using a LPM transaction that includes a two-phase extended USB transaction made up of an extended token phase and a handshake phase. To transition from L0 to L1 state, a host device transmits two token packets (a token packet and an extended token packet) and the device receiving the token packets transmits a handshake packet to accept or reject the power state transition.

In a serial bus repeater, a transition from L0 to L1 state is detectable by decoding the packets to identify an LPM transaction. However, packet decoding requires that the repeater include an accurate clock source, a phase-locked-loop (PLL), clock and data recovery (CDR) circuitry, and other expensive digital circuitry that increases the size and cost of the repeater. The serial bus repeater circuits disclosed herein identify an L0 to L1 power state transition without use of a PLL, CDR circuitry, or decoding of the packets associated with an LPM transaction. Instead, the serial bus repeater circuits identify an L0 to L1 power state transition by identifying the packets that indicate a request a for power state transition, and after identifying a power state transaction, measuring the impedance of the serial bus to determine whether the bus termination values indicate that a transition from L0 to L1 has occurred.

Figure 1:
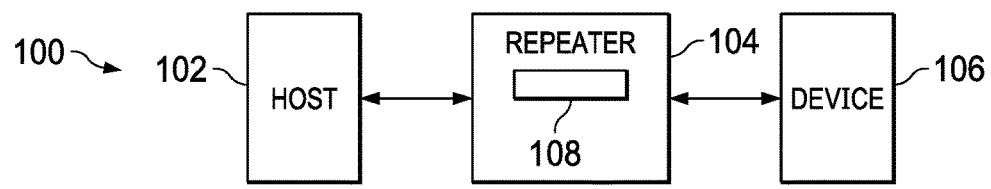
FIG. 1 shows a block diagram for an example serial bus system that includes a repeater with a low power state identification circuit in accordance with the present disclosure.

FIG. 1 shows a block diagram for an example serial bus system 100 that includes a repeater with a low power state identification circuit in accordance with the present disclosure. The serial bus system 100 includes a host 102, serial bus repeater 104, and a device 106. The host 102 and the device 106 communicate via the serial bus repeater 104. The serial bus system 100 is a USB 2.0 system in some implementations, and the host 102 is a USB 2.0 host, the device 106 is a USB 2.0 device, and the serial bus repeater 104 is a USB 2.0 repeater. In some implementations of the serial bus system 100, the serial bus repeater 104 electrically isolates the host 102 and the device 106. In other implementations of the serial bus system 100, the serial bus repeater 104 does not electrically isolate the host 102 and the device 106. The serial bus repeater 104 receives, conditions, and retransmits signals received from the host 102 or the device 106. Some implementations of the serial bus repeater 104 do not decode the data packets received from the host 102 or the device 106.

The serial bus repeater 104 includes a low power state identification circuit 108. The low power state identification circuit 108 identifies a transition to a reduced power state in the serial bus system 100 without decoding the packets transmitted via the serial bus. As each packet on the serial bus passes through the serial bus repeater 104, the low power state identification circuit 108 identifies a series of sequential packets that are indicative of a power state transaction. When a series of packets indicative of a power state transaction is identified, the low power state identification circuit 108 measures the termination resistance of the serial bus to determine whether the host 102 has transitioned to a reduced power state (e.g., an L1 state).

Figure 2:
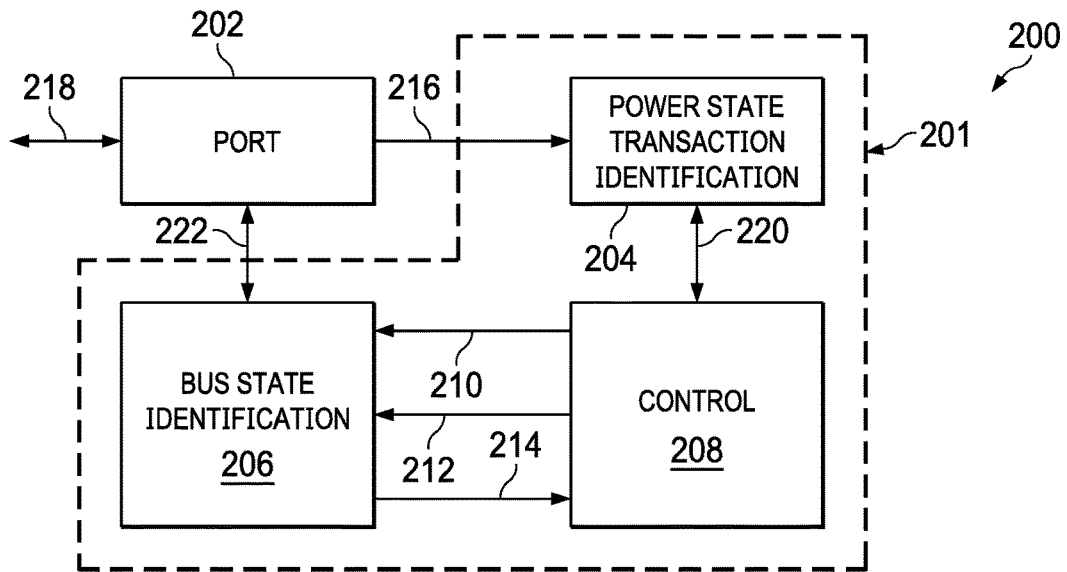
FIG. 2 shows a block diagram for a portion of an example serial bus repeater that includes a low power state identification circuit in accordance with the present disclosure.

FIG. 2 shows a block diagram for a portion of an example serial bus repeater 200 that includes a low power state identification circuit in accordance with the present disclosure. The serial bus repeater 200 is an implementation of the serial bus repeater 104. The serial bus repeater 200 includes a port circuit 202 and a low power state identification circuit 201. The low power state identification circuit 201 is an implementation of the low power state identification circuit 108. The port circuit 202 couples the serial bus repeater 200 to the conductors 218 of a serial bus for communication. The port circuit 202 is coupled to the low power state identification circuit 201. The port circuit 202 receives packets transmitted via the conductors 218 and provide the packets 216 to the low power state identification circuit 201.

The low power state identification circuit 201 includes a power state transaction identification circuit 204, a bus state identification circuit 206, and a control circuit 208. The power state transaction identification circuit 204 and the bus state identification circuit 206 are coupled to the port circuit 202 and the control circuit 208. The power state transaction identification circuit 204 measures the duration of the packets 216 received via the port circuit 202. Based on the measured duration of the packets 216, the power state transaction identification circuit 204 determines whether a packet 216 is potentially part of a series of packets defining a power state transaction between the host 102 and the device 106. The power state transaction is indicative of transitioning to the L1 state. If a series of packets indicative of a power state transaction is identified, then power state transaction identification circuit 204 notifies the control circuit 208, via the signal 220.

Responsive to detection of a series of packets 216 indicative of a power state transaction, the control circuit 208 triggers operation of the bus state identification circuit 206. Because the serial bus repeater 200 does not decode the packets 216, the serial bus repeater 200 cannot determine with certainty that the serial bus has transitioned to a reduced power state based on the series of packets, rather the series of packets indicate that the serial bus has potentially transitioned to a reduced power state. The bus state identification circuit 206 determines whether the termination resistance on the serial bus indicates that the serial bus has transitioned to a reduced power state. When the serial bus transitions to a reduced power state the value of termination resistance coupled to the conductors 218 is increased. Thus, the termination resistance is indicative of transitioning to the L1 state. The bus state identification circuit 206 measures the termination resistance on the conductors 218 to determine whether the serial bus has transitioned to a reduced power state.

Figure 3:
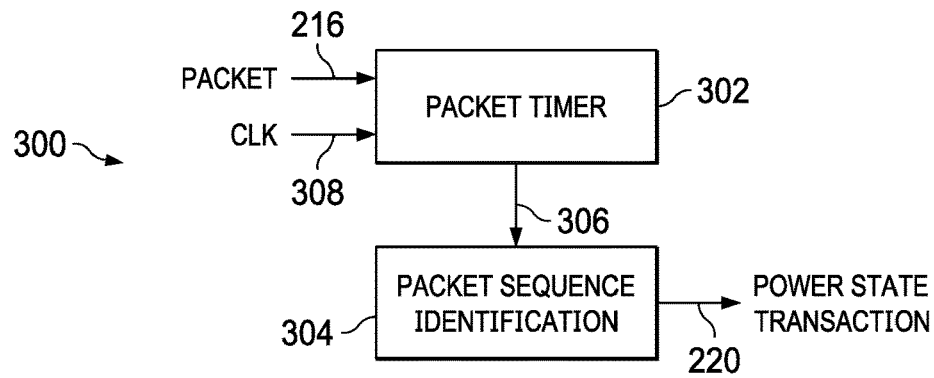
FIG. 3 shows a block diagram for an example power state transaction identification circuit in accordance with the present disclosure.

FIG. 3 shows a block diagram for an example power state transaction identification circuit 300 in accordance with the present disclosure. The power state transaction identification circuit 300 is an implementation of the power state transaction identification circuit 204. The power state transaction identification circuit 300 includes a packet timer circuit 302 and a packet sequence identification circuit 304 coupled to the packet timer circuit 302. The packet timer circuit 302 measures the duration of each packet received by the serial bus repeater 200. For example, the packet timer circuit 302 includes a counter that is incremented by a clock signal over an interval during which a packet is received by the serial bus repeater 200 to measure packet duration.

Figure 4:
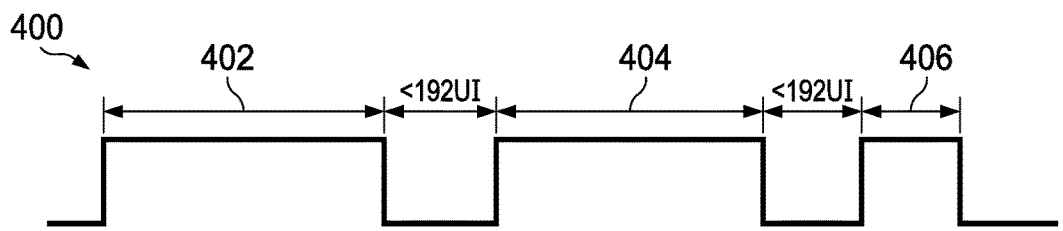
FIG. 4 shows an example of packet timing for a power state transaction on a serial bus.

FIG. 4 shows an example of packet timing for a power state transaction on the serial bus. In FIG. 4, the power state transaction includes packet 402, packet 404, and packet 406. The packet 402 is a token packet transmitted by the host 102, the packet 404 is an extended token packet transmitted by the host 102, and the packet 406 is a handshake packet transmitted by the device 106 responsive to receipt of the packet 402 and the packet 404. The packet 402 and the packet 404 are of equal length (e.g., each is 3 bytes in length), and the packet 406 is one byte in length as provided by the USB 2.0 specification and the LPM addendum thereto. The packet timer circuit 302 measures the duration of the packet 402, the packet 404, the packet 406, and all other packets received by the serial bus repeater 200.

The packet timer circuit 302 provides packet duration measurements to the packet sequence identification circuit 304. The packet sequence identification circuit 304 applies the packet duration measurements to identify a series of sequential packets that are indicative of a power state transaction. The packet sequence identification circuit 304 classifies the packet duration measurements as being indicative of a power state transaction or not indicative of a power state transaction. For example, any packet duration longer than the predetermined duration of the packet 402 is not indicative of a power state transaction. If the packet sequence identification circuit 304 receives a first packet duration measurement having a value corresponding to the predetermined duration of the packet 402, then the packet sequence identification circuit 304 initiates identification of power state transaction. If a second packet duration value received immediately subsequent to the first packet duration value also has a value corresponding to the predetermined duration of the packet 402 (i.e., the duration of the packet 404), then identification of a packet state transaction continues. If, on the other hand, the second packet duration value does not have a value corresponding to the predetermined duration of the packet 402, then the series of packets is not a power state transaction, and identification of a power state transaction using the current packet series is discontinued.

If the first and second packet duration values have a value corresponding to the predetermined value of the packet 402 and the packet 404, and if a third packet duration value received immediately subsequent to the second packet duration value has a value corresponding to the predetermined duration of the packet 406, then a packet state transaction has been identified, and the packet sequence identification circuit 304 activates the signal 220 to notify the control circuit 208. If the third packet duration value does not have a value corresponding to the predetermined duration of the packet 406, then the series of packets is not a power state transaction, and identification of a power state transaction using the current packet series is discontinued.

Figure 5:
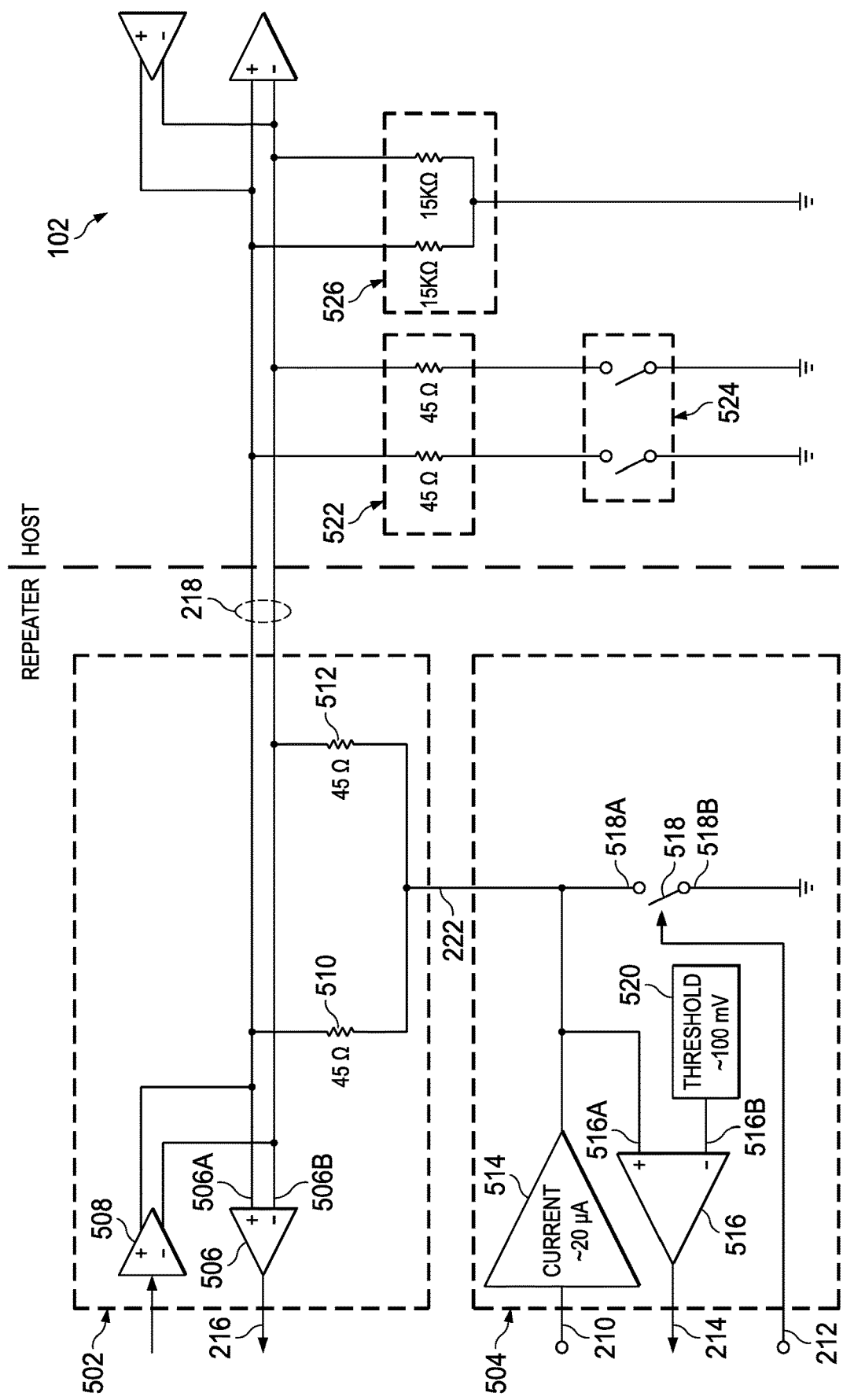
FIG. 5 shows a schematic for an example port circuit and an example bus state identification circuit included in a serial bus repeater in accordance with the present disclosure.

FIG. 5 shows a schematic for an example port circuit 502 and an example bus state identification circuit 504 included in a serial bus repeater in accordance with the present disclosure. Circuitry of a port of the host 102 (which is not part of the serial bus repeater) is also shown to illustrate the change in termination resistance that occurs with the transition to a reduced power state. The port circuit 502 includes a differential receiver 506, a differential driver 508, a termination resistor 510, and a termination resistor 512.

The differential receiver 506 includes an input 506A and an input 506B. The input 506A is coupled to the conductors 218 and the termination resistor 510. The input 506B is coupled to the conductors 218 and the termination resistor 512. An output of the differential receiver 506 is coupled to the power state transaction identification circuit 204 (e.g., the packet timer circuit 302).

The bus state identification circuit 504 is an implementation of the bus state identification circuit 206, and includes a current source 514, a comparator 516, a switch 518, and a threshold voltage source 520. The switch 518 selectably connects the termination resistor 510 and the termination resistor 512 to ground. The switch 518 includes a terminal 518A that is coupled to the termination resistor 510 and the termination resistor 512, and a terminal 518B that is coupled to ground. The switch 518 is controlled by a signal 212 received from the control circuit 208.

The current source 514 is coupled to the terminal 518A of the switch 518, the termination resistor 510, and the termination resistor 512. The current source 514 sources a current to the termination resistor 510 and the termination resistor 512 for use in measuring the termination resistance coupled to the conductors 218. The current source 514 is controlled by a signal 210 received from the control circuit 208. Some implementations of the current source 514 source a current of approximately 20 microamperes.

The comparator 516 compares the voltage at the termination resistor 510 and the termination resistor 512 to a threshold voltage to measure the termination resistance coupled to the conductors 218. The comparator 516 includes an input 516A coupled to the current source 514, the terminal 518A of the switch 518, the termination resistor 510, and the termination resistor 512, and an input 516B coupled to the threshold voltage source 520. Some implementations of the threshold voltage source 520 generate a threshold voltage of approximately 100 millivolts.

When the power state transaction identification circuit 204 identifies a series of packets on the serial bus that is indicative of a power state transaction, the power state transaction identification circuit 204 signals the control circuit 208, which in turn triggers the bus state identification circuit 504 to measure the termination resistance on the conductors 218. When the host 102 transitions to a reduced power state (e.g., the L1 state), the host 102 opens switches 524 to disconnect the termination resistors 522 from ground, which increases the termination resistance connected to the conductors 218 as the conductors 218 are connected to ground via the resistors 526. Thus, by measuring the termination resistance connected to the conductors 218, the bus state identification circuit 504 determines whether the host 102 has transitioned to a reduced power state.

To measure the termination resistance connected to the conductors 218, the control circuit 208 activates the signal 212 to cause the bus state identification circuit 504 to open the switch 518, and disconnect the termination resistor 510 and the termination resistor 512 from ground. After the switch 518 is opened, the control circuit 208 activates the signal 210 to activate the current source 514. The current flow from the current source 514 produces a voltage drop across the termination resistance coupled to the conductors 218. If the termination resistors 522 are connected to ground, then the voltage at the input 516A of the comparator 516 is less than the threshold voltage and the host 102 has not transitioned to a reduced power state, while if the termination resistors 522 are disconnected from ground, then the voltage at the input 516A of the comparator 516 is greater than the threshold voltage and the host 102 has transitioned to a reduced power state. The comparator 516 provides the signal 214 to the control circuit 208 to indicate the state of the termination resistance connected to the conductors 218 and the power state of the host 102. Because the current source 514 raises the common mode voltage at the termination resistor 510 and the termination resistor 512 to a voltage that is within specifications for the serial bus, the host 102 does not detect the operation of the bus state identification circuit 504 as a disconnection of the serial bus repeater 200 from the conductors 218.

Figure 6:
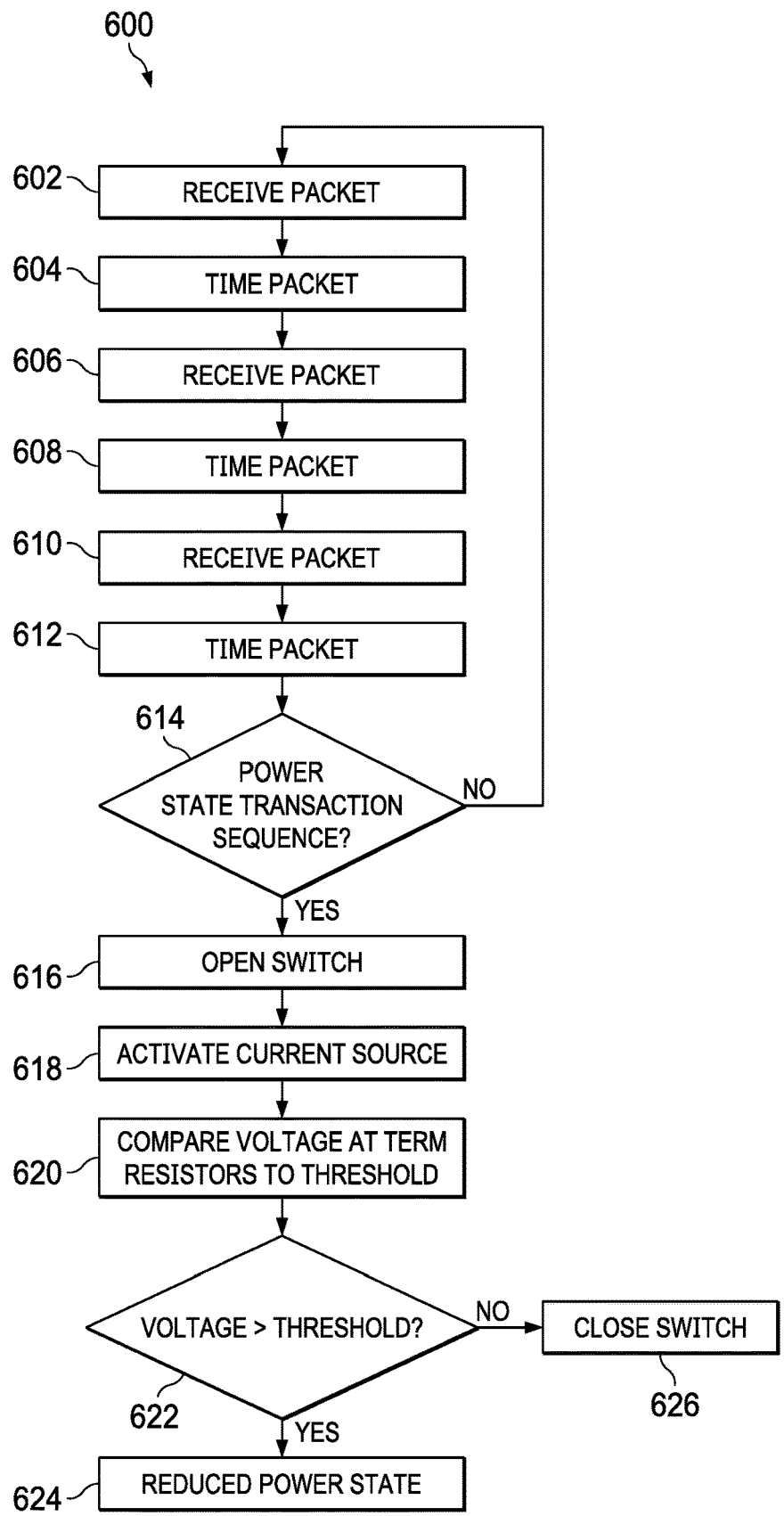
FIG. 6 shows a flow diagram for an example method for identifying a reduced power state on a serial bus in accordance with the present disclosure.

FIG. 6 shows a flow diagram for an example method for identifying a reduced power state on a serial bus in accordance with the present disclosure. Though depicted sequentially as a matter of convenience, at least some of the actions shown can be performed in a different order and/or performed in parallel. Additionally, some implementations may perform only some of the actions shown.

In block 602, the serial bus repeater 104 receives a first packet via the serial bus. For example, the differential receiver 506 detects transmission of a packet on the conductors 218, and bit-wise provides the packets 216 to the low power state identification circuit 201. In a power state sequence transaction, the first packet is transmitted by the host 102.

In block 604, the packet timer circuit 302 measures the duration of the received first packet. The packet timer circuit 302 provides the duration measurement value to the packet sequence identification circuit 304.

In block 606, the serial bus repeater 104 receives a second packet via the serial bus. For example, the differential receiver 506 detects transmission of a packet on the conductors 218, and bit-wise provides the packets 216 to the low power state identification circuit 201. In a power state sequence transaction, the second packet is transmitted by the host 102.

In block 608, the packet timer circuit 302 measures the duration of the received second packet. The packet timer circuit 302 provides the duration measurement value to the packet sequence identification circuit 304. The packet timer circuit 302 also measures the idle time between the first packet and the second packet.

In block 610, the serial bus repeater 104 receives a third packet via the serial bus. For example, the differential receiver 506 detects transmission of a packet on the conductors 218, and bit-wise provides the packets 216 to the low power state identification circuit 201. In a power state sequence transaction, the third packet is transmitted by the device 106.

In block 612, the packet timer circuit 302 measures the duration of the received third packet. The packet timer circuit 302 provides the duration measurement value to the packet sequence identification circuit 304. The packet timer circuit 302 also measures the idle time between the second packet and the third packet.

In block 614, the packet sequence identification circuit 304 determines whether the packets received in blocks 602, 606, and 610 constitute a power state sequence transaction. For example, the packet sequence identification circuit 304 compares the packet duration measurement values generated in blocks 604, 608, and 614 to the expected duration values for the packets 402, 404, and 406. The packet sequence identification circuit 304 also compares the time between the first and second packets to an expected value (e.g., 192 unit intervals or less), and compares the time between the second and third packets to an expected value (e.g., 192 unit intervals or less). If the packet duration measurement values and the inter-packet time values generated in blocks 604, 608, and 612 conform to the times expected for a power state sequence transaction, then the method 600 continues in block 616 with bus state identification. Otherwise monitoring for a power state sequence transaction continues in block 602.

In block 616, a potential power state transaction has been identified by the power state transaction identification circuit 204, and the bus state identification circuit 206 operates to measure termination resistance on the serial bus and determine whether a transition to a reduced power state has occurred. The switch 518 is opened to disconnect the termination resistor 510 and the termination resistor 512 from ground.

In block 618, the current source 514 is activated to provide a current through the termination resistors coupled to the conductors 218.

In block 620, the comparator 516 compares the voltage at the junction of the switch 518, the termination resistor 510, and the termination resistor 512 to a threshold voltage provided by the threshold voltage source 520.

In block 622, if the voltage at the junction of the switch 518, the termination resistor 510, and the termination resistor 512 exceeds the threshold voltage provided by the threshold voltage source 520, then the low power state identification circuit 201 deems the host 102 to have transitioned to a reduced power state in block 624. If the voltage at the junction of the switch 518, the termination resistor 510, and the termination resistor 512 does not exceed the threshold voltage provided by the threshold voltage source 520, then low power state identification circuit 201 deems the host 102 to have not transitioned to a reduced power state, and closes the switch 518 in block 626.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A serial bus repeater circuit, comprising:
   a differential receiver circuit having a first input, a second input and an output;
   a first termination resistor having a first terminal and a second terminal wherein the first terminal of the first termination resistor is directly coupled to the first input of the differential receiver circuit;
   a second termination resistor having a first terminal and a second terminal wherein the first terminal of the second termination resistor is directly coupled to the second input of the differential receiver circuit;
   a power state transaction identification circuit having an input wherein the input of the power state transaction identification circuit is directly coupled to the output of the differential receiver circuit; and
   a bus state identification circuit having a input wherein the input is directly coupled to the second terminal of the first termination resistor and to the second terminal of the second termination resistor and comprising:
      a switch comprising:
         a first terminal coupled to the input of the bus state identification circuit; and
         a second terminal coupled to ground;
      a current source coupled to the first terminal of the switch; and
      a comparator comprising:
         a first input coupled to the first terminal of the switch; and
         a second input coupled to a threshold voltage source.

2. The serial bus repeater circuit of claim 1, wherein the power state transaction identification circuit comprises:
   a packet timer circuit having an input and an output wherein the input of the packet timer circuit is coupled to the input of the power state transaction identification circuit; and
   a packet sequence identification circuit having an input wherein the input of the packet sequence identification circuit is coupled to the output of the packet timer circuit.

3. The serial bus repeater circuit of claim 2, wherein:
   the packet timer circuit is configured to measure a duration of each packet received by the differential receiver circuit; and
   the packet sequence identification circuit is configured to identify a series of sequential packets received by the differential receiver, wherein each of the sequential packets has a duration indicative of a power state transaction.

4. The serial bus repeater circuit of claim 3, wherein the series of sequential packets comprises:
   a first packet having a first predetermined duration;
   a second packet, immediately subsequent to the first packet, having the first predetermined duration; and
   a third packet, immediately subsequent to the second packet, having a second predetermined duration.

5. The serial bus repeater circuit of claim 1, wherein:
   the current source is configured to provide a current of approximately 20 microamperes; and
   the threshold voltage source is configured to provide a threshold voltage of approximately 100 millivolts.

6. The serial bus repeater circuit of claim 1, wherein the bus state identification circuit is configured to:

open the switch responsive to the power state transaction identification circuit identifying a power state transaction;
activate the current source responsive to opening the switch;
compare a voltage at the first terminal of the switch to a threshold voltage provided by the threshold voltage source; and
close the switch responsive to the voltage at the first terminal of the switch being less than the threshold voltage provided by the threshold voltage source.

\* \* \* \* \*